United States Patent
Buttolph

(10) Patent No.: US 9,694,900 B2
(45) Date of Patent: Jul. 4, 2017

(54) ACTUATORS FOR FLIGHT CONTROL SURFACES

(71) Applicant: Simmonds Precision Products, Inc., Vergennes, VT (US)

(72) Inventor: Martin E. Buttolph, Middlebury, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 414 days.

(21) Appl. No.: 14/228,004

(22) Filed: Mar. 27, 2014

(65) Prior Publication Data
US 2015/0353186 A1    Dec. 10, 2015

Related U.S. Application Data

(60) Provisional application No. 61/873,136, filed on Sep. 3, 2013.

(51) Int. Cl.
| B64C 5/16 | (2006.01) |
| B64C 9/00 | (2006.01) |
| B64C 13/28 | (2006.01) |
| B64C 13/32 | (2006.01) |

(52) U.S. Cl.
CPC ............ B64C 9/00 (2013.01); B64C 5/16 (2013.01); B64C 13/28 (2013.01); B64C 13/32 (2013.01)

(58) Field of Classification Search
CPC ............ B64C 13/28; B64C 13/32; B64C 5/16
See application file for complete search history.

(56) References Cited

U.S. PATENT DOCUMENTS

| 3,731,546 A * | 5/1973 | MacDonald ............ B64C 13/00 244/87 |
| 4,575,025 A | 3/1986 | Sadvary et al. |
| 5,255,882 A | 10/1993 | Schroppel |
| 9,151,370 B2 * | 10/2015 | Li ........................ F16H 25/20 |

FOREIGN PATENT DOCUMENTS

| DE | 3121136 A1 | 12/1982 |
| EP | 0365377 A1 | 4/1990 |

OTHER PUBLICATIONS

Search Report and Opinion issued by the European Patent Office on Feb. 11, 2015 for European Patent Application No. 14181356.

* cited by examiner

*Primary Examiner* — Brian M O'Hara
(74) *Attorney, Agent, or Firm* — Locke Lord LLP; Scott D. Wofsy; Christopher J. Cillié

(57) ABSTRACT

An actuator assembly includes an actuator body, a ram, and a cross pin. The actuator body has an internal axial cavity bounded by an actuator body wall and defines a pivot axis. A longitudinal slot extends along a portion of the length of the actuator body wall and is in communication with the internal axial cavity. The ram is slidably received within the axial cavity of the actuator body. The cross pin is mounted to the ram and extends laterally from the ram and into the longitudinal slot for converting linear motion of the ram into rotational motion about the pivot axis for displacing a control surface of an air vehicle.

9 Claims, 6 Drawing Sheets

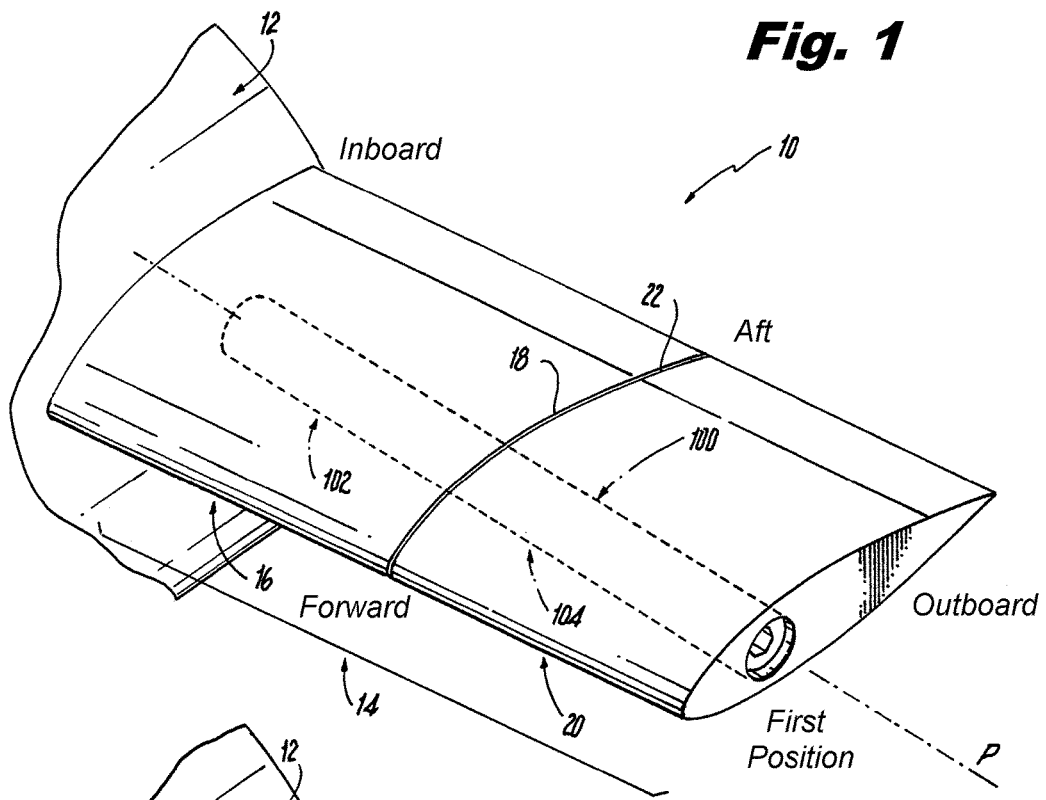
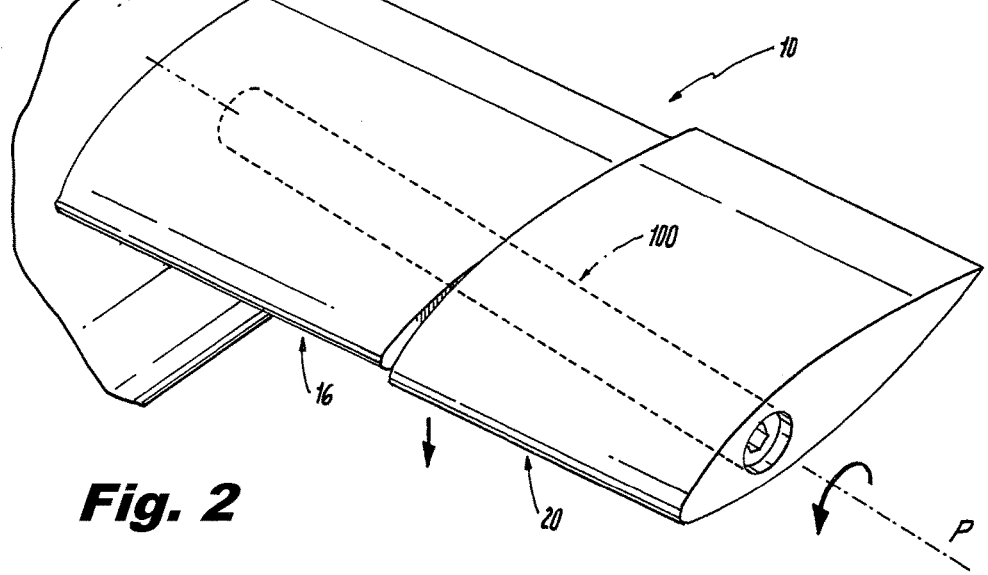

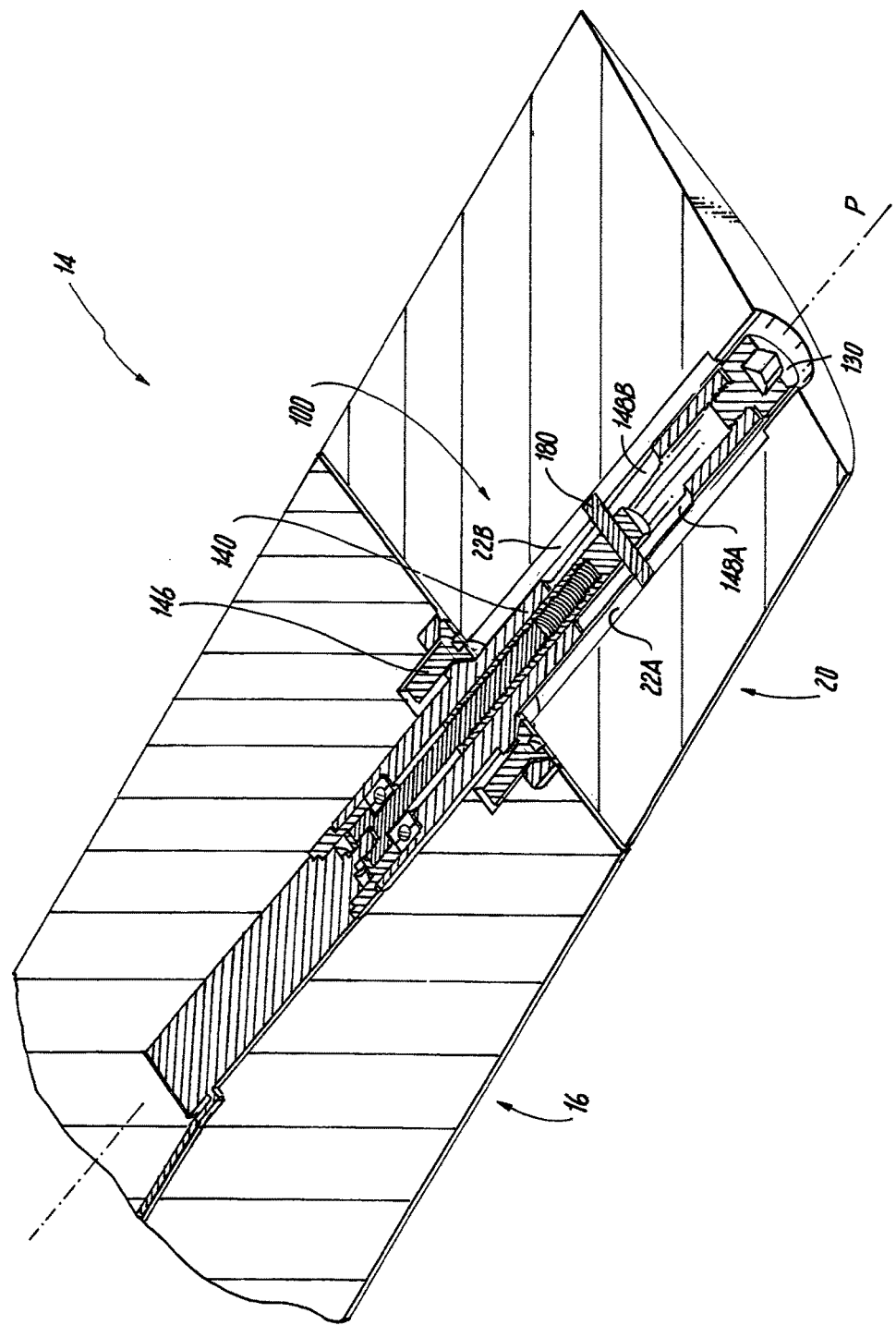

ACTUATORS FOR FLIGHT CONTROL SURFACES

CROSS-REFERENCE TO RELATED APPLICATIONS

This application claims priority to U.S. Provisional Application No. 61/873,136 filed Sep. 3, 2013 which is incorporated by reference herein in its entirety.

BACKGROUND OF THE INVENTION

1. Field of the Invention

The present disclosure relates to air vehicle flight control, and more particularly to actuators for air vehicle control surfaces.

2. Description of Related Art

Air vehicles typically include flight surfaces and control surfaces. Fight surfaces are typically fixed with respect to the air vehicle while control surfaces are generally movable in relation the air vehicle. During flight, air flowing across air vehicle flight surfaces and control surfaces imparts forces on the surfaces. Air flowing across flight surfaces tends to generate an upward oriented force, providing lift to the air vehicle. Air flowing across control surfaces tends to apply force to the air vehicle that is a function of the orientation of the control surface with respect to the air vehicle, thereby providing control of the vehicle during flight. Actuators coupled to the control surface control the position and orientation of the control surfaces with respect to the air vehicle during flight. Such actuators generally include force-generating elements that couple to control surfaces through linkages that transmit force for moving the surface, thereby providing control.

Such conventional methods and systems have generally been considered satisfactory for their intended purpose. However, there is still a need in the art for improved actuators for control surfaces. The present disclosure provides a solution for this need.

SUMMARY OF THE INVENTION

An actuator assembly for an air vehicle flight control system includes an actuator body, a ram, and a cross pin. The actuator body has a wall that bounds an internal cavity and defines a longitudinal slot that is in communication with the internal cavity. The cross pin mounts to the ram and extends laterally across cavity and into the longitudinal slot. The nut tube or ram is slidably received within the cavity of the actuator body and is movable along a pivot axis defined by the actuator body. The actuator body is configured such that movement of the nut tube or ram along the pivot axis drives the cross pin along the length of the longitudinal slot, thereby pivoting the cross pin about the pivot axis for rotating a control surface about the actuator body. The cross pin can constrain rotation of the nut tube or ram with respect to the pivot axis while imparting rotation to the control surface.

In certain embodiments, the actuator assembly can include a lead screw with a male threaded portion. The male threaded portion of the lead screw can be received within a female threaded portion of the ram for driving the ram along the pivot axis as the lead screw rotates. An end of the lead screw opposite the ram can connect to a motor configured for rotating the lead screw and driving the ram along the pivot axis. A shaft of the motor can directly connect to the lead screw for rotating the lead screw with a 1:1 gear ratio for example.

In accordance with certain embodiments, the longitudinal slot can be parallel to the pivot axis. The cross pin can be orthogonal to the pivot axis. A pin-receiving slot formed in the interior of the control surface can have an inclined or helical shape offset from the longitudinal slot and the pivot axis. The cross pin can extend through the longitudinal slot such that an end of the cross pin is received within pin-receiving slot. It is contemplated that the linear longitudinal slot can be a first linear longitudinal slot and the actuator body can form a second linear longitudinal slot on a side of the pivot axis opposite the first linear longitudinal slot. The first and second linear longitudinal slots and pivot axis can be coplanar with one another. The pin-receiving slot can be a first pin-receiving slot and the interior of the control surface can form a second pin-receiving slot with an inclined or helical shape offset from the second longitudinal slot and pivot axis. Opposite ends of the cross pin can extend through the first and second longitudinal slots and can be received within the first and second pin-receiving slots for pivoting the control surface as the cross pin is driven axially along the pivot axis.

It is contemplated that in certain embodiments the longitudinal slot can have an inclined or helical shape forming a segment of a helix extending about the pivot axis. The pin-receiving slot in the control surface can be a linear pin-receiving slot parallel to the pivots axis. The inclined or helical longitudinal slot can be a first inclined or helical longitudinal slot and that the actuator body can form a second inclined or helical second longitudinal slot on a side of the pivot axis opposite the first inclined or helical longitudinal slot. The linear pin-receiving slot can be a first linear pin-receiving slot and the control surface can form a second linear pin-receiving slot offset from the second inclined or helical longitudinal slot and pivot axis. The first and second linear pin-receiving slots and the pivot axis can be parallel with one another. Opposite ends of the cross pin can extend through the first and second inclined or helical longitudinal slots and can be received within the first and second linear pin-receiving slots for pivoting the control surface as the cross pin is driven axially along the pivot axis.

It is also contemplated that a portion of the actuator body including the longitudinal slot can form a bulged region for increasing the leverage applied by the cross pin to the pin-receiving slot formed in the control surface, thereby potentially reducing backlash (angular slop). The control surface can define an interior pocket such that the control surface can rotate about the bulged region.

An air vehicle includes a wing with a flight surface, a control surface, and actuator assembly as described above. The actuator body has an inboard portion and an outboard portion. The inboard portion is fixed within the flight surface. The control surface is axially fixed to the outboard portion of the actuator assembly and rotatable about the pivot axis such that movement of the ram along the pivot axis deflects the control surface with respect to the flight surface for controlling flight of the air vehicle.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a perspective view of a portion of an air vehicle wing, showing a wing flight surface and control surface coupled to one another by an actuator assembly;

FIG. 2 is a perspective view of the air vehicle of FIG. 1, showing the control surface deflected in relation to the flight surface;

FIG. 3E is a cross-sectional view of the wing of FIG. 1, showing the cross pin engaging pin-receiving slots defined within the interior of the control surface.

DETAILED DESCRIPTION OF THE PREFERRED EMBODIMENTS

Figure 3A:
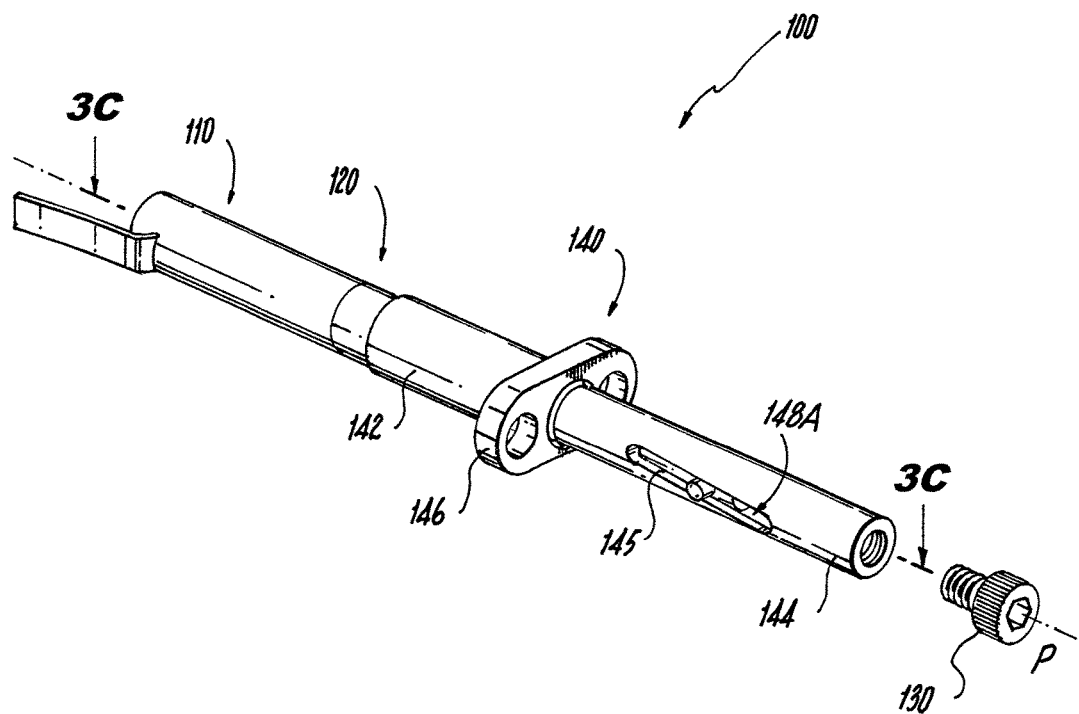
FIG. 3A is a perspective view of the actuator assembly of FIG. 1, showing the actuator body and a longitudinal slot defined by the actuator body with a cross pin disposed therein.

Reference will now be made to the drawings wherein like reference numerals identify similar structural features or aspects of the subject disclosure. For purposes of explanation and illustration, and not limitation, a partial view of an exemplary embodiment of a flight control actuator in accordance with the disclosure is shown in FIGS. 1-2 and is designated generally by reference character 100. Details of exemplary of embodiments of control surface actuators in accordance with the disclosure, or aspects thereof, are provided in FIGS. 3-4, as will be described. The systems and methods described herein can be used for actuating mechanical devices, such as air vehicle control surfaces or valve movable members for example.

With reference to FIG. 1, an air vehicle 10 is shown. Flight vehicle 10 includes a fuselage 12 and wing 14. Wing 14 includes a flight surface 16, an actuator assembly 100 (shown schematically in dashed outline), and a control surface 20. Flight surface 16 connects to fuselage 12 at its inboard end. Actuator assembly 100 is disposed within flight surface 16 and control surface 20 and movably couples control surface 20 to flight surface 16. Control surface 20 is a wing tip assembly configured for deflecting with respect to flight surface 16, and thereby controlling flight of air vehicle 10.

Flight surface 16 has an outboard edge 18 and control surface 20 has an inboard edge 22. Actuator assembly 100 movably couples control surface 20 to flight surface 16 such that outboard edge 18 of flight surface 16 is adjacent to inboard edge 22 of control surface 20. FIG. 1 shows control surface 20 in a first position wherein the profile of control surface 20 overlaps the profile of flight surface 16 such that flight surface 16 and control surface 20 form a substantially contiguous surface.

Actuator assembly 100 defines a pivot axis P extending through flight surface 16 and control surface 20. To prevent interference during motion, pivot axis P is perpendicular to outboard edge 18 of flight surface 16 and inboard edge 22 of control surface 20. An inboard portion of actuator assembly 100 is fixed within flight surface 16 and an outboard portion of actuator assembly 100 is disposed within control surface 20. Pivot axis P forms a pivot axis about which control surface 20 is drivably pivotable by actuator 100 and movable in relation to flight surface 16.

With reference to FIG. 2, control surface 20 is shown in a second position. In the second position, operation of actuator 100 pivots control surface 20 about pivot axis P such that control surface 20 is deflected downwards with respect to flight surface 16. This positions the leading edge of control surface 20 below the leading edge of flight surfaced 16, as oriented in FIG. 2. In a third position (not shown in FIG. 2 for clarity purposes, but shown in FIG. 3D), operation of actuator 100 pivots control surface 20 about pivot axis P such that control surface 20 is deflected upwards with respect to flight surface 16, positioning the leading edge of control surface 20 above the leading edge of flight surface 16. As will be appreciated by those skilled in the art, this alters airflow across wing 14 and imparts force on air vehicle that can change (or control) flight of air vehicle 10. As will also be appreciated, controlling both the amount of deflection and the responsiveness of movement of control surface 20 to a desired position influence the degree to which the flight of air vehicle 10 can be controlled.

Figure 3B:
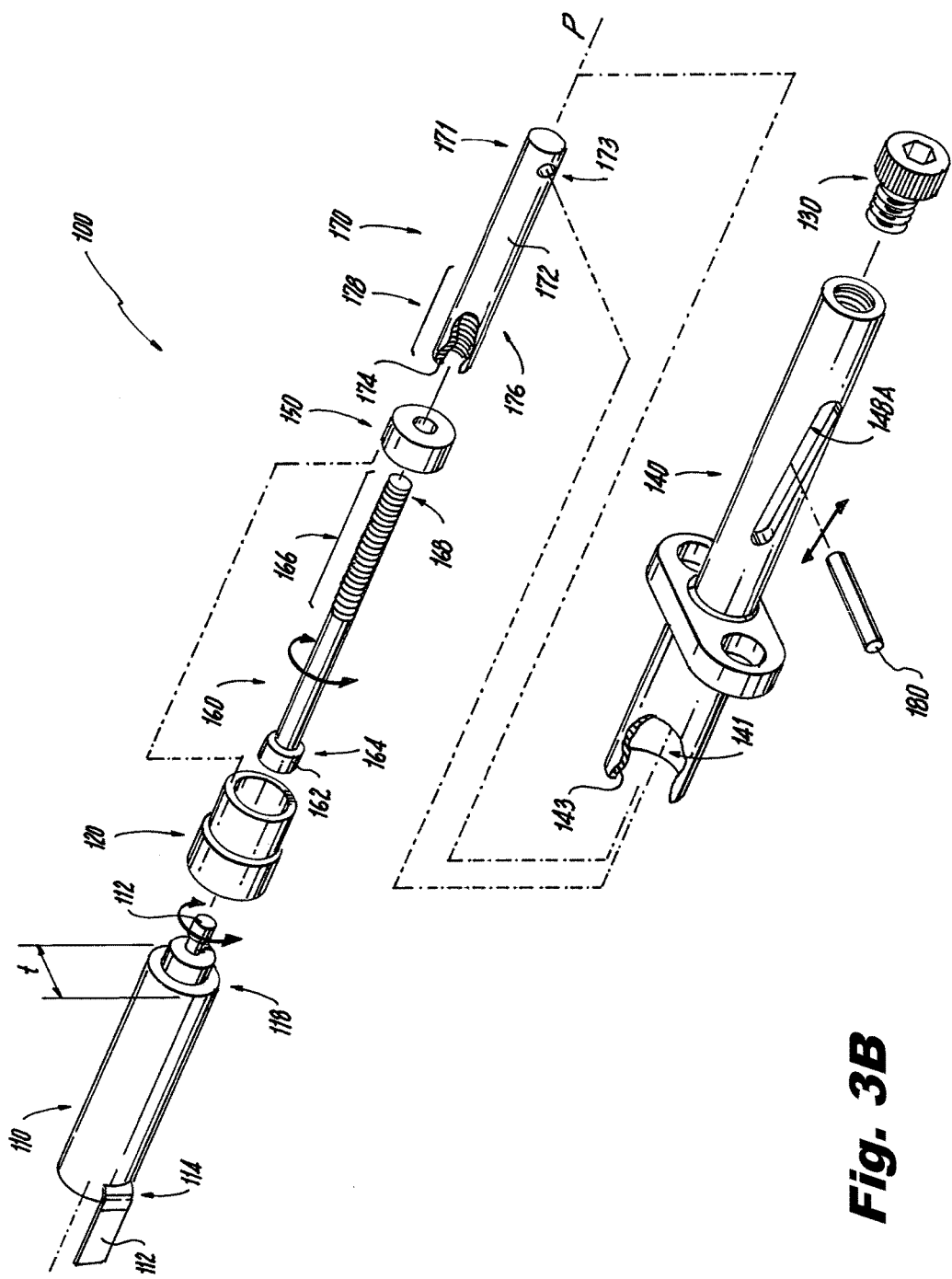
FIG. 3B is an exploded view of the actuator assembly of FIG. 1, showing individually elements of the actuator assembly.

With respect to FIG. 3A, actuator assembly 100 is shown. Actuator assembly 100 includes a motor 110, a mounting adapter 120, an end cap 130, an actuator body 140, a lead screw 160 (shown in FIG. 3B), and a nut tube or ram 170 (shown in FIG. 3B). Actuator body 140 has an inboard portion 142 and an outboard portion 144. Inboard portion 142 of actuator body 140 is configured for seating within flight surface 16 using a flange 146 formed by actuator body 140. Outboard portion 144 of actuator body 140 is configured for coupling control surface 20 to flight surface 16 by axially fixing control surface 20 with respect flange 146. With reference to FIG. 3B, mounting adapter 120 joins an end of motor 110 to inboard end 142 (shown in FIG. 3A) of actuator body 140 such that rotation of a motor shaft 112 about pivot axis P rotates lead screw 160. Rotation of lead screw 160 drives nut tube or ram 170 axially within actuator body 140, axially driving a cross pin 180 in the direction of motion of nut tube or ram 170. This motion deflects control surface 20 in relation to flight surface 16, pivoting control surface 20 about pivot axis P and providing control for the air vehicle (shown in FIG. 1) attached thereto. End cap 130 is received within a threaded segment defined on outboard portion 144 of actuator body 140, axially fixing control surface 20 on outboard portion 144 of actuator body 140.

In embodiments, motor 110 has a diameter that is less than the thickness of flight surface 16 and control surface 20. In certain embodiments, motor 110 has a diameter that is between about 4 millimeters (about 0.16 inches) and about 6 millimeters (about 0.24 inches). Examples of suitable small diameter motors are the Maxon RE 6 series motor, available from Maxon Precision Motors, Inc. of Fall River, Mass., and the Faulhaber 416 series motor, available from Faulhaber GmbH & Co. of Schonaich, Germany. It is to be understood that the relatively small diameter of motor 110 and actuator body allow for incorporation of actuator assembly 100 in wings with relatively small thicknesses.

With continuing reference to FIG. 3B, actuator assembly 100 is shown in an exploded view. Actuator body 140 is a hollow body with an inboard wall portion 143 and an outboard wall portion 145. Inboard and outboard portions 143 and 145 of actuator body 140 define internal cavity 141, which extends through inboard and outboard portions 142 and 144 of actuator 140. Outboard wall portion 145 (shown in FIG. 3A) defines a forward facing first longitudinal slot 148A and an aft facing longitudinal 148B (shown in FIG. 3C). First and second longitudinal slots 148A and 148B extend through the thickness of outboard wall portion 145 and are communicative with internal cavity 141. A bearing 150, a lead screw 160, and nut tube or ram 170 are disposed within internal cavity 141, and are operatively associated with motor 110 for axially driving cross pin 180 along respective axial lengths of first and second longitudinal slots 148A and 148B.

Bearing 150 has an internal core configured for receiving lead screw 160 and has an outer periphery configured to seat against an interior surface of inboard wall portion 143. Bearing 150 seats within internal cavity 141 and is retained (i.e. captured) by mounting adapter 120 within inboard portion 142 of actuator body 140, thereby radially and axially fixing lead screw 160 within internal cavity 141 and allowing rotation of lead screw 160 about pivot axis P.

Lead screw 160 has an inboard portion 164 and an outboard portion 168. Inboard portion 164 has a motor coupling 162 configured for receiving motor shaft 112. Outboard portion 168 has a male threaded segment 166 and is configured for being received by nut tube or ram 170. As illustrated, motor shaft 112 couples to inboard portion 164 of lead screw 160 directly such that motor shaft 112 and lead screw 160 rotate in gearless concert with one another. In embodiments, a reduction gear box couples motor shaft 112 to inboard portion 164 of lead screw 160. This allows for matching rotational speed of motor 110 and the rate of movement of cross pin 180 are suitable for a given application, thereby improving the mechanical advantage of motor 110. Lead screw 160 can also incorporate rolling elements, such as a ball screw or roller nut, to reduce friction during actuation. This can reduce the power required by motor 110. It can also further improve the responsiveness of actuator assembly 100.

Nut tube or ram 170 has an axially extending body 172 with an inboard portion 176, an outboard portion 171, and an interior lead screw-receiving cavity 174. Outboard portion 171 has a cross hole 173 that is configured to receive cross pin 180. Lead screw-receiving cavity 174 has a female threaded segment 178 formed along a length of inboard portion 176. Threads of male threaded segment 166 of nut tube or ram 170 threadably engage corresponding female threads of female threaded segment 178 such that axially fixed rotation of lead screw 160 drives nut tube or ram 170 axially along pivot axis P. In embodiments, respective male and female threaded segments 166 and 178 have relatively fine pitches. This can increase the mechanical advantage of motor 110 and torque output of actuator assembly 100.

Figure 3C:
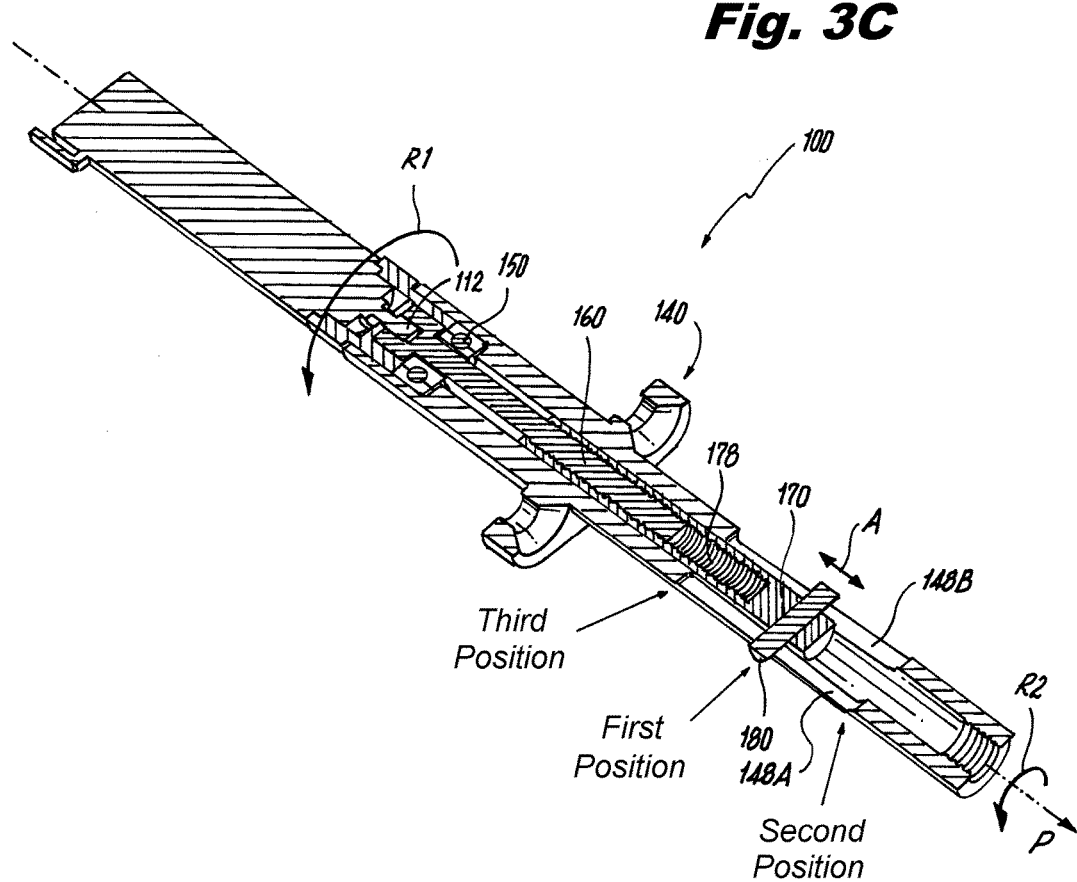
FIG. 3C is a cross-sectional view of the actuator assembly of FIG. 1, showing the helical shape of longitudinal slot defined by the actuator body, according to an embodiment.

With reference to FIG. 3C, actuator assembly 100 is shown in cross section. Cross pin 180 mounts within cross hole 173 such that it is substantially orthogonal with respect to pivot axis P. A forward facing end of cross pin 180 extends through first longitudinal slot 148A and an aft facing end of cross pin 180 extends through second longitudinal slot 148B, cross pin 180 thereby being slideably received within first and second longitudinal slots 148A and 148B. In this respect first and second longitudinal slots 148A and 148B provide guides for cross pin 180 as nut tube or ram 170 axially displaces cross pin 180 along pivot axis P. Guiding cross pin 180 as it axially displaces along pivot axis P in turn constrains rotation of nut tube or ram 170 about pivot axis P while imparting rotation to control surface 20. For illustration purposes and not for purposes of limitation, first longitudinal slot 148A is shown arranged on a forward face of actuator body 140 and second longitudinal slot 148B is arranged on an aft face of actuator body 140. As will be appreciated by those skilled in the art, other relative orientations are possible and remain within the scope of the present disclosure.

Cross pin 180 can further include rolling elements to reduce friction between cross pin 180 and first and second longitudinal slots 148A and 148B. In the illustrated embodiment, first and second longitudinal slots 148A and 148B trace segments of helices coaxial with pivot axis P. The helical shape of slots 148A and 148B causes rotation of nut tube or ram 170 about pivot axis P as nut tube or ram 170 is driven axially along pivot axis P by rotation of lead screw 160. Rotation of nut tube or ram 170 causes cross pin 180 to rotate about pivot axis P. As cross pin 180 rotates about pivot axis P, opposing ends of cross pin 180 apply oppositely directed forces against first and second pin receiving slots 22A and 22B (shown in FIG. 5E). This deflects control surface 20 about pivot axis P. As will be appreciated, the rotation can be relatively small in relation to the axial travel of cross pin 180 thereby providing improved control surface deflection resolution. It is contemplated that first and second longitudinal slots 148A and 148B can have a non-helical shape for imparting non-linear relative motion in response to rotation of motor shaft 112 as suitable for a given application.

Figure 3D:
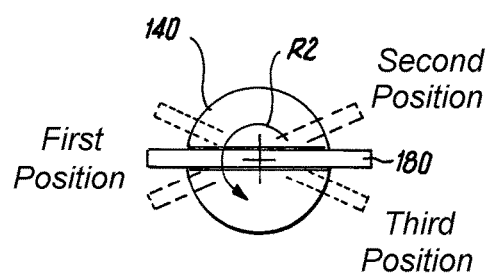
FIG. 3D is a schematic end view of the actuator assembly of FIG. 1, showing pivot angles of the cross pin about the pivot axis in first, second, and third axial positions along the axis.

With reference to FIG. 3D, actuator body 140 and cross pin 180 are shown in an end view with cross-pin 180 in first, second, and third positions. When cross pin 180 is in its first axial position (shown in FIG. 3C), cross pin 180 is substantially level and in the orientation shown in FIG. 3D in solid outline. When cross pin 180 is displaced axially in the outboard direction toward a second axial position (shown in FIG. 3C) by the above described operation of nut tube or ram 170, cross pin 180 rotates in a counter clockwise direction R2 about pivot axis P and into the orientation shown in FIG. 3D in dashed outline. When cross pin 180 is displaced axially in the inboard direction toward a third axial position (shown in FIG. 3C), cross pin 180 rotates clockwise about pivot axis P and into the orientation shown in FIG. 3D in dotted outline. As will be appreciated, driving cross pin 180 axially outboard progressively rotates cross pin 180 counterclockwise about pivot axis P. Similarly, driving cross pin 180 axially inboard progressively rotates cross pin 180 clockwise about pivot axis P. It is contemplated first and second longitudinal slots 148A and 148B can be right-handed or left-handed slots to reverse the sense of the control surface deflection relative to motor rotation direction.

With reference to FIG. 3E, wing 14 is shown in cross section. Control surface 20 has defined within its interior a first pin-receiving slot 22A and a second pin-receiving slot 22B. First and second pin-receiving slots 22A and 22B are parallel to pivot axis P, and as illustrated are respectively disposed on forward and aft sides of actuator assembly 100 with respect leading and trailing edges of control surface 20. In embodiment, first and second pin-receiving slots 22A and 22B can also be substantially coplanar with one another. This can potentially reduce thickness of control surface 20.

First and second pin-receiving slots 22A and 22B receive respective forward and aft ends of cross pin 180. The above-described pivoting motion of cross pin 180 about pivot axis P resulting from axial displacement along pivot axis P causes the opposite ends of cross pin 180 to exert oppositely directed forces on control surface 20 as they traverse first and second pin-receiving slots 22A and 22B. In this respect, placement of cross pin 180 in the first axial position (shown in FIG. 3C) orients cross pin 180 in the first angular position (shown in FIG. 3D), thereby orienting control surface 20 into the first position (shown in FIG. 1). Similarly, placement of cross pin 180 in the second axial position (shown in FIG. 3C) orients cross pin 180 in the second angular position (shown in FIG. 3D), thereby orienting control surface 20 into its second position (shown in FIG. 2). Likewise, placement of cross pin 180 in the third axial position (shown in FIG. 3C) orients cross pin 180 in the second angular position (shown in FIG. 3D), thereby orienting control surface 20 into the third position (not shown for clarity purposes). In this respect, embodiments of actuator assembly 100 can provide actuation for devices requiring rotary actuation. While operation of the actuator assembly 100 has been illustrated in the context of flight surface 16, it will be appreciated that embodiments of actuator assembly are suitable for actuating other types of devices, such as movable valve members for example.

Figure 4:
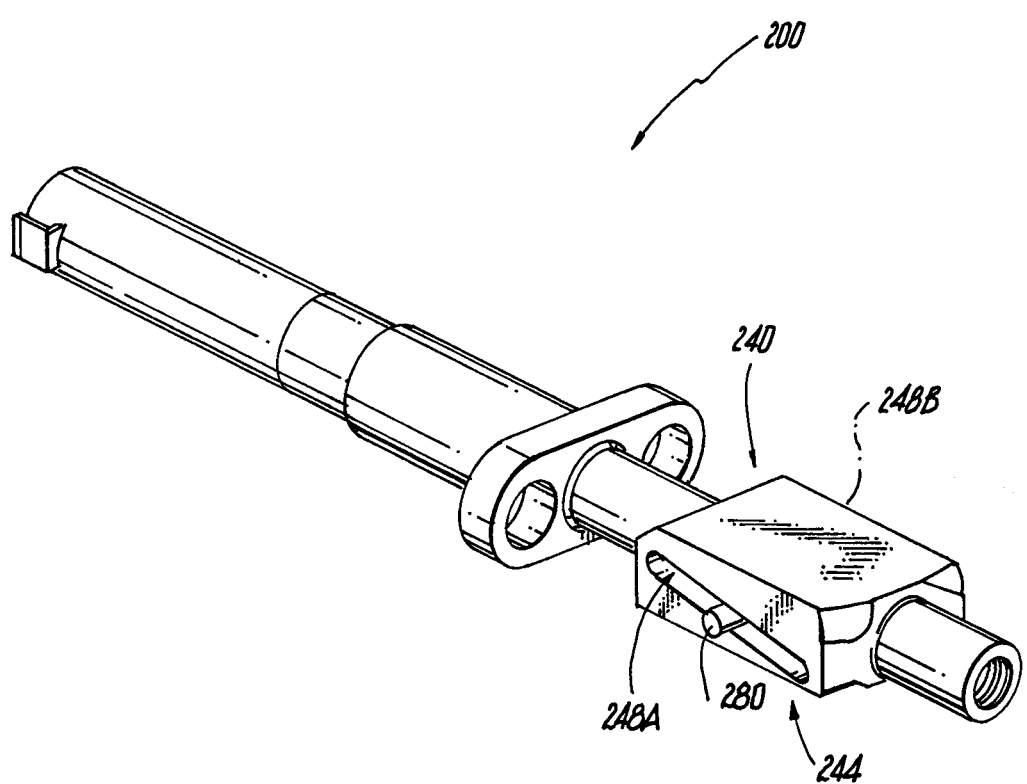
FIG. 4 is a perspective view of another embodiment of an actuator, showing an actuator body with bulged region of the outboard portion of the actuator body.

With reference to FIG. 4, an actuator assembly 200 is shown. Actuator assembly 200 is similar to actuator assembly 100 and includes an actuator body 240 and a cross pin 280. Cross pin 280 is longer than cross pin 180, enabling cross pin 280 to exert greater leverage on control surface 20 and potentially allowing for control of more massive air vehicles. Actuator body 240 has a bulged region 243 on outboard portion 244. Bulged region 243 has first and second longitudinal slots 248A and 248B that are separated by a greater distance than that separating first and second longitudinal slots 48A and 48B. Bulged region 243 also includes contouring that allows for incorporation of actuator assembly 200 into wing 14 without increasing wing thickness. Bulged region 243 can also be captive within control surface 20, thereby fixing control surface 20 to actuator assembly 200. This simplifies construction of actuator assembly 200 as end cap 130 is not required for axially fixing control surface 20 to flight surface 16.

The greater separation (offset) of first and second longitudinal slots 248A and 248B from pivot axis P in relation to the separation (offset) of first and second longitudinal slots 148A and 248B can provide for less lost angular motion or backlash resulting from slop between ends of cross pin 280 and first and second longitudinal slots 248A and 248B. This can provide reduced backlash between control surface 20 and flight surface 16, backlash being the tendency of motor 110 to rotate lead screw 150 without displacing nut tube or ram 170 following a change in motor direction. As will be appreciated, reducing backlash improves the responsiveness of actuator assembly 200 to commanded adjustments that include motor rotation direction changes. This can allow for looser tolerance in the geometry of first and second longitudinal slots 248A and 248B with respect to the diameter of cross pin 280, simplifying manufacture of actuator assembly 200.

It is to be appreciated that reversing the above-described arrangement is possible within the scope of the present disclosure. For example, actuator assembly can be reversed such that motor 110 is disposed within the interior of control surface 20 and forward and aft pin-receiving slots 22A and 22B are disposed within flight surface 16. Alternatively, first and second longitudinal slots 148A and 148B can be parallel with pivot axis P, and forward and aft pin-receiving slots 22A and 22B can both have helical shapes, such as suitable for an intended application. As will be appreciated, first, second and third positions are exemplary and intermediate positions can be used for flight control.

The methods and systems of the present disclosure, as described above and shown in the drawings, provide actuators with superior properties such as simple construction and compact actuation. Embodiments of actuators described herein can also integrally provide kinematic and structural pivot for control surfaces. In embodiments such as air vehicles, embodiments can provide actuators housing with air vehicles wings for controlling control surface deflection with reduced backlash and improved responsiveness. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An air vehicle, comprising:
   a flight surface;
   a wing tip with a flight control surface outboard of the flight surface; and
   an actuator assembly coupling the control surface to the flight surface, including:
      an actuator body with a wall bounding an internal axial cavity and a longitudinal slot, wherein the longitudinal slot is communicative with the axial cavity through the wall;
      a ram slidably received within the axial cavity; and
      a cross pin mounted to the ram and extending laterally from the ram into the longitudinal slot, wherein the actuator body defines a pivot axis and wherein the cross pin and longitudinal slot are configured to convert linear motion of the ram into rotational motion about the pivot axis for deflecting the control surface in relation to the flight surface,
      wherein the ram has an axial length that is greater than an axial length of the longitudinal slot of the actuator body,
      wherein the longitudinal slot is parallel with the pivot axis, and
      wherein the control surface includes a pin-receiving slot with an inclined or helical shape defined in the control surface.

2. The air vehicle as recited in claim 1, wherein the actuator body integrally couples the control surface to the flight surface and provides a structural pivot for the control surface.

3. The air vehicle as recited in claim 1, wherein the actuator body defines a bulged region on its outboard portion, wherein the bulged region axially fixes the flight control surface in relation to the actuator body.

4. The air vehicle as recited in claim 1, wherein the flight surface and control surface define an airfoil with an interior, wherein the actuator assembly is disposed within the interior of the airfoil.

5. The air vehicle as recited in claim 1, further including a motor housed within an interior of the control surface and operatively associated with the ram.

6. The air vehicle as recited in claim 1, further including a motor housed within the interior of the flight surface and operative associated with the ram.

7. The air vehicle as recited in claim 2, wherein the longitudinal slot has an inclined or helical shape about the pivot axis, wherein the control surface defines a pin-receiving slot that is parallel with the pivot axis.

8. The actuator assembly as recited in claim 1, wherein the cross pin has a first position and a second position, wherein the second position is axially offset from the first position along the pivot axis, wherein the second position is pivotably offset relative to the first position about the pivot axis.

9. An actuator assembly, comprising:
- an actuator body with an internal axial cavity bounded by an actuator body wall and a longitudinal slot communicating through the actuator body wall and into the cavity;
- a ram slidably received within the axial cavity; and
- a cross pin mounted to the ram and extending laterally from the ram and into the longitudinal slot, wherein the actuator body defines a pivot axis and the cross pin and longitudinal slot are configured to convert linear motion of the ram into rotational motion about the pivot axis for pivoting a wing tip control surface of an air vehicle about the pivot axis,
- wherein the longitudinal slot is parallel with the pivot axis,
- wherein the control surface includes a pin-receiving slot with an inclined or helical shape defined in a wing tip control surface of an air vehicle,
- wherein the longitudinal slot has an inclined or helical shape extending about the pivot axis, and
- wherein the control surface defines a pin-receiving slot that is parallel with the pivot axis.

\* \* \* \* \*